June 30, 1925.

J. H. BAKER

PNEUMATIC PRESSURE DEVICE

Filed April 30 1924

INVENTOR
JAMES. H. BAKER
BY,
ATTORNEYS.

June 30, 1925.

J. H. BAKER

PNEUMATIC PRESSURE DEVICE

Filed April 30, 1924

INVENTOR
JAMES. H. BAKER
BY,
Graham + Luin
ATTORNEYS.

June 30, 1925.

J. H. BAKER 1,543,897

PNEUMATIC PRESSURE DEVICE

Filed April 30, 1924   3 Sheets—Sheet 3

INVENTOR
JAMES. H. BAKER
BY,
Graham + Laurie
ATTORNEYS

Patented June 30, 1925.

1,543,897

UNITED STATES PATENT OFFICE.

JAMES HENRY BAKER, OF LOS ANGELES, CALIFORNIA, ASSIGNOR TO EDWARD WESTBERG, OF LOS ANGELES, CALIFORNIA.

PNEUMATIC-PRESSURE DEVICE.

Application filed April 30, 1924. Serial No. 710,186.

*To all whom it may concern:*

Be it known that I, JAMES HENRY BAKER, a citizen of the United States, residing at Los Angeles, in the county of Los Angeles and State of California, have invented a new and useful Pneumatic-Pressure Device, of which the following is a specification.

My present invention is a pneumatic pressure device whose essential features are capable of embodiment in a wide variety of forms for various uses, the disclosed embodiment being especially suitable for use as a jack or sufficient capacity for the lifting of automobiles, or for similar purposes.

The objects of my invention will appear from the following description of alternative embodiments thereof, taken in connection with the appended claims and the accompanying drawing, in which Fig. 1 is a top plan view of an embodiment of my device suitable for use as an automobile jack, with parts broken away.

Fig. 5 is a plan view of an alternative embodiment, hereinafter referred to.

Figure 1:
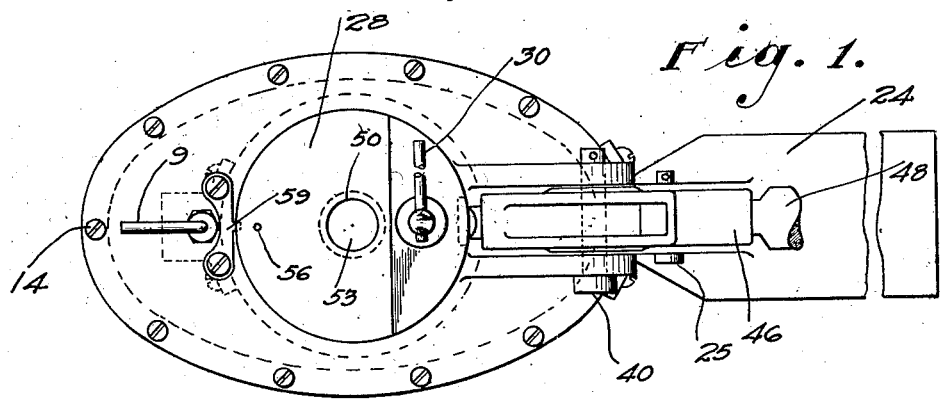

Referring to the details of that specific embodiment of my invention illustrated in Figs. 1 to 4 inclusive, 11 is a main body comprising an outer wall and an inner wall 12, these walls being separated by a space 13 adapted to receive air or another elastic fluid under pressure, the outer wall being shown as cast separately from the inner wall, although rigidly connected thereto as by means of screws 14, and the inner wall being shown as provided with an outwardly-opening valve 15, having a seat 16 in said inner wall and a stem 17, shown as extending through a housing 18 within which a spring 19 is confined, said valve being operable from the exterior by means of a handle 19 whose shaft 20 may be provided at 21 and 22 with suitable stuffing boxes.

Air may be admitted to the reservoir or chamber 13, by means such as an inwardly opening valve 23 seated in the outer wall 11, this last mentioned valve being preferably of the usual tire valve construction; and, when my device is to be used as a portable jack, the body 11 may advantageously be provided with a foot plate 24 shown as pivoted at 25 and as adapted to aid in holding the jack in position.

In order that air, admitted through the inwardly-opening valve 23, shall be effective in the lifting of a load, I may provide within the inner wall 12, constituting an outer cylinder, a composite piston shown as comprising an outer section 26, in the form of an inverted cup, and the inner section 27, the said outer section being shown as provided with a plate or boss 28 adapted directly to support a load and as rotatably supporting a rod 29 by the manual manipulation of which the said inner and outer piston sections may be interconnected at will, the upper end of the rod 29 being provided with a handle 30, and the lower end thereof being provided with a catch 31 capable of engaging a keeper 32 provided on the inner piston section.

When compressed air is admitted into the space 33 beneath a composite piston of the general character referred to, the pressure on the admitted air may be effective to elevate together the interlocked sections of the composite piston, and thereby any load 34 upon the plate or boss 28.

In order normally to retain the outer piston section 26, constituting an inner cylinder within which the inner piston section 27 is capable of independent movement, except when interlocked therewith, I may provide means such as a catch or detent 35, shown as normally pressed inward by means of a spring 36, although releasable by means of a handle 37; and it may be understood that the release of this detent should be so synchronized with the opening of the valve 15 by means such as the handle 19 that the outer piston section shall be free to move upward upon the admission of air; and only so much air need be admitted as may be required satisfactorily to elevate a load, both the valve 15 and the detent 35 being provided with means for their automatic restoration to their normal positions.

After repairs have been completed, or whenever a jack, or the like, is to be withdrawn, the rod 29, or its equivalent, may be so turned as to release the catch by which the piston sections are interlocked, whereupon, the exposed lower or inner surface 38 of the outer piston section 26 being insufficient to support the load, and the respective piston sections being free to move in opposite directions, the inner piston section will move outwardly or upwardly as the outer piston section moves downwardly or inwardly, and a portion of the air previously confined beneath the interlocked sections of the composite piston may be forced outwardly past the valve 15 and into the reservoir 13. In order conveniently to free the jack from beneath the load 34, I may employ means such as a ratchet device, my disclosed means for this purpose comprising a lever 39, pivoted at 40 upon ears 41 extending above the reservoir 13, the pivot pin 40 being shown as adapted to retain, within an arm 42 of said lever, a tooth or dog 43, pressed outwardly by a spring 44 housed within said arm, the dog 43 being shown as adapted to engage the same set of ratchet teeth 45, in the outer surface of the inner cylinder 26, with which the mentioned detent 35 also cooperates. The outer arm 46 of the ratchet lever 39 may be provided with a socket 47 adapted to receive a handle 48, which may advantageously be provided on one of its ends with a screw thread 49, adapting it alternatively to be rotated within a correspondingly threaded aperture 50 in the boss or top of the outer piston element 26. This construction is intended to enable the mentioned handle element to be used alternatively either in the operation of the mentioned ratchet, manually to depress the said outer element by downward engagement of the dog 43 with the ratchet teeth 45, or by engagement of its rounded end 51 with a corresponding socket 52 in the upper surface of the inner piston element 27, in the depression of said inner piston element into the relative position shown in Fig. 2. The aperture 50 may be normally closed in any suitable way, as by means of a flap 53 of leather or other suitable material, this flap being shown as retained by means of a screw 54 and a washer 55; but, in order to provide for a gradual escape of air, permitting the inner piston section 27 to move upward or outward within the outer piston section 26, means such as a bore 56 may advantageously be provided, both the outer and inner piston sections being respectively provided at 57 and 58 with suitable packing, and means such as a detent 59, extending into a slot 60, being provided to prevent relative rotation or complete or unintended withdrawal of the outer piston section. Between the respective outer and inner castings defining the main body and air chamber of my device, packing 61 may optionally be interposed, and, if desired, a waterproof coating (not shown), may be applied throughout the interior of said air chamber.

Figure 2:
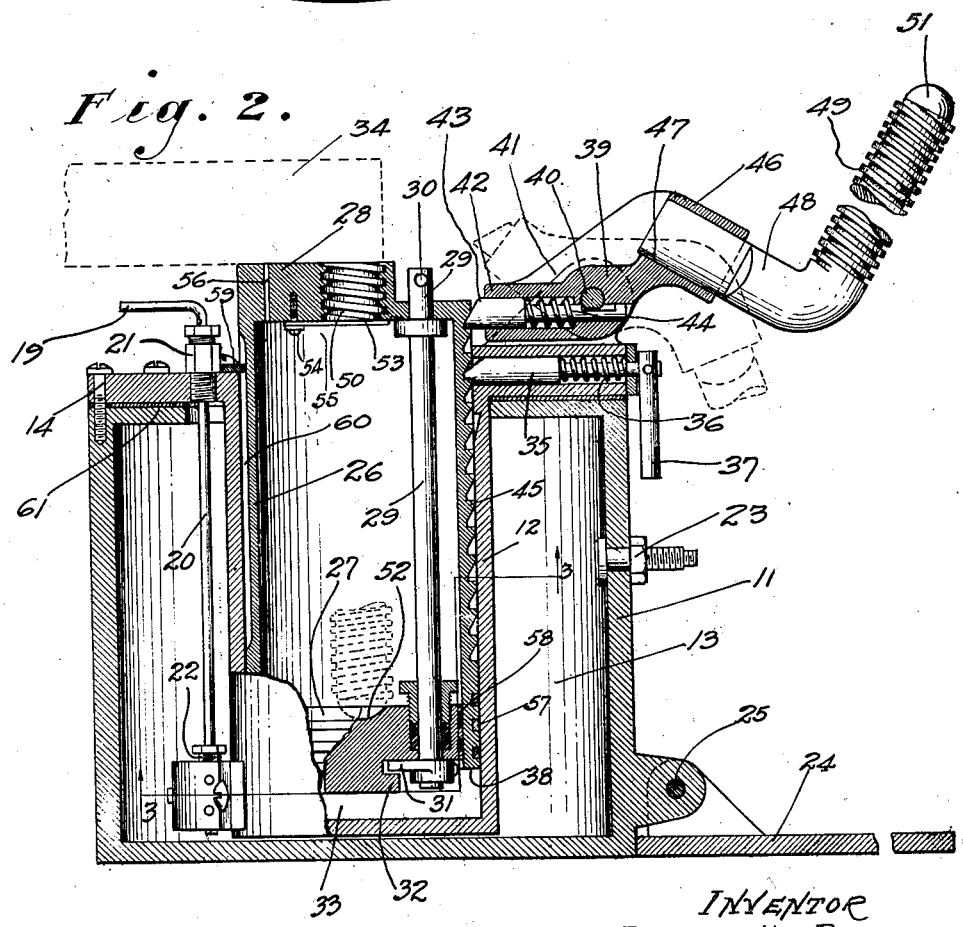
Fig. 2 is a substantially central vertical section through the same.
Figure 3:
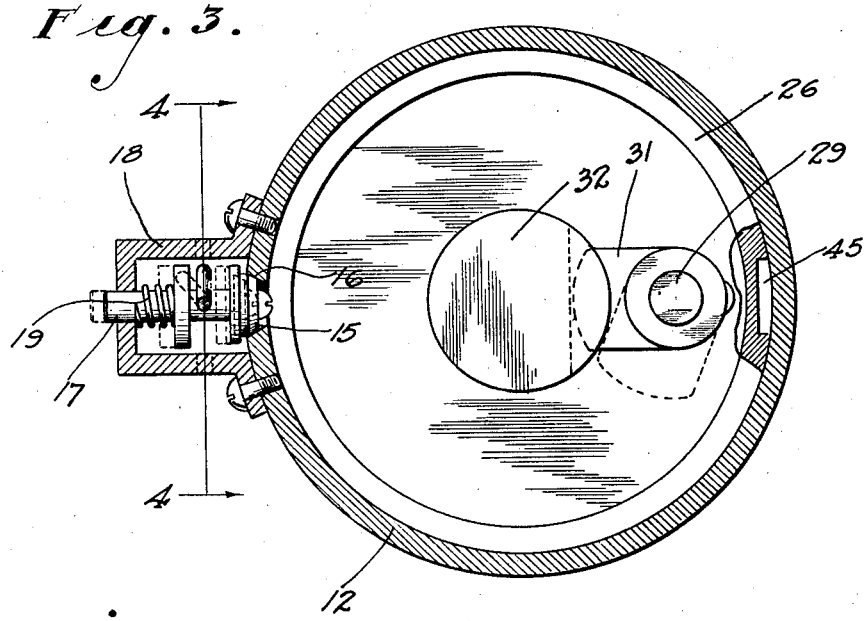
Fig. 3 is a somewhat enlarged horizontal sectional view substantially in the plane indicated by the broken line 3—3 of Fig. 2.
Figure 4:
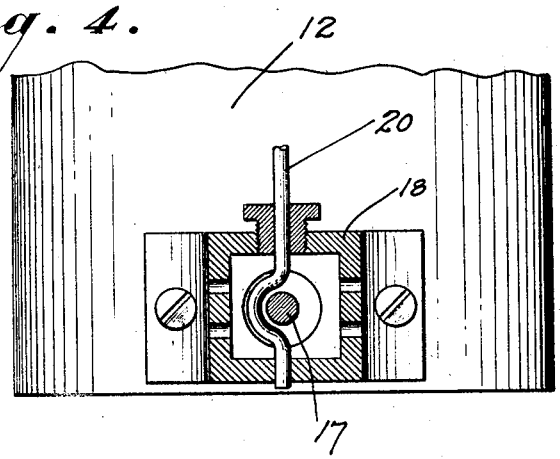
Fig. 4 is a further enlarged vertical section taken as indicated by the line 4—4 of Fig. 3.
Figure 5:
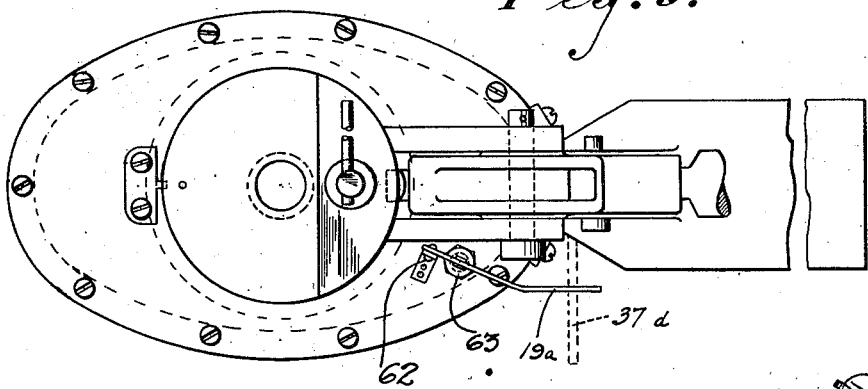
Figure 6:
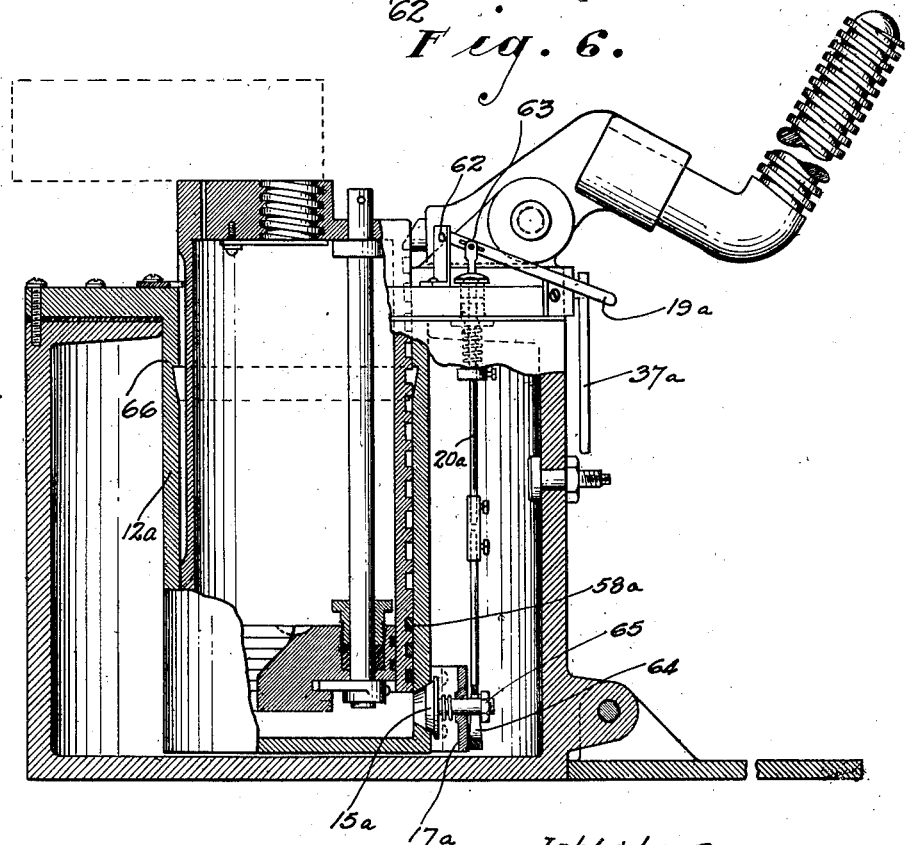
Fig. 6 is a vertical sectional view of the form shown in Fig. 5.

In the alternative form shown in Figs. 5 and 6, the essential parts of my pressure device may be similar to those already described, but I indicate in these figures a modification by which the movements of the handle $37^a$, controlling a detent such as is shown at 35 in Fig. 2 may be interconnected or synchronized with the movements of an outwardly opening valve $15^a$, corresponding to the valve 15, shown in Fig. 3, the handle $19^a$ by which the valve $15^a$ is controlled, being so interposed in the path of rotative movement of the handle $37^a$ that an inward movement of air past the valve $15^a$ may occur simultaneously with the releasing movement of the detent 35, the depression of the handle $37^a$ being effective both to check the upward movement of the interlocked sections of the composite piston and to permit a closing of the valve $15^a$, although the described construction is such as optionally to permit of an independent movement of either the handle $37^a$ or the handle $19^a$. The latter is shown as having the form of a lever fulcrumed at 62 and having at 63 a pin-and-slot connection with a rod $20^a$ carrying a cam or wedge 64 adapted to engage a nut 65 upon the outer end of the valve stem $17^a$ in such manner that the elevation of the handle $19^a$ must be effective to open the valve $15^a$. As an additional means to prevent my composite piston from popping out of the cylinder $12^a$, the upper packing ring $58^a$ may be metallic and resiliently extensible; and I may provide a shoulder 66 on the interior surface of the said cylinder, automatically engaging said resilient packing to limit the outward movement thereof.

In the employment of a jack of the character above described, air being admitted through the valve 23, or its equivalent, and retained for an indefinite period partially or wholly within the reservoir 13, it will be obvious that whenever the valve 15 (or $15^a$) is opened, the handles 19 and 37 (or $19^a$ and $37^a$) being simultaneously manipulated, the upward movement of the interlocked sections of the composite piston may be effective to elevate or support a load. To permit a load to descend, the rod 29 or its equivalent being turned to release the catch by which the piston sections are interlocked, and the inner piston section 27 being free to move upward, assuming that the air pressure beneath the composite piston was only sufficient to support the load, the outer piston section will obviously descend during the rise of the inner piston section, and the weight of the load, now concentrated upon the exposed area 38 of the outer piston section, may be effective to force compressed air past the valve 15 ($15^a$). To disengage the jack from beneath a load, the handle 48 may be employed to manipulate the ratchet dog 43, the detent 35 holding the outer piston section in its depressed or inner position; and, after the withdrawal of the jack, the threaded end 49 of the handle 48 may be employed, by the rotation of said handle within the threaded orifice 50, to depress the inner piston section 27, permitting the same to be interlocked with the outer piston section 26, all parts being thereby restored to their original position, and the air within the reservoir 13 being recompressed in readiness for a repetition of the operations described. It is, of course, well known that the expansion and compression of air are accompanied by changes of temperature, but any cooling effect due to the expansion of air admitted past the valve 15 (15ª) may be more than offset by a heating effect due to the work done by the air so released; and in any event, thermal effects are comparatively immaterial to the operation and reuse of my jack, the use of which involves very small loss of energy and only such losses as are easily compensated by the manual or other depression of the respective cylinder sections, as described. The leverage relationships involved in these depressions are so favorable as to permit of the use of my jack by a lady or child, and experiment has established the possibility of maintaining all joints sufficiently tight to permit the retention of an original charge of air, which may be at a pressure of 125 pounds, more or less, per square inch, for months or years at a time.

Although I have herein described two comparatively simple alterative embodiments of my invention, it will be understood that the same is capable of embodiment in widely different organizations for totally dissimilar uses, and also that various features of my invention might be independently employed, without the slightest departure from the spirit and scope of my invention, as the same is indicated above and in the following claims.

I claim as my invention:

1. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid.

2. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said confining means comprising an annular chamber whose inner walls serve as a piston cylinder.

3. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said confining means comprising an annular chamber whose inner walls serve as a piston cylinder, said inner wall being provided with an outwardly-opening valve.

4. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load.

5. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, but movable in opposite directions during the lowering of a load.

6. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, one of said sections being in the form of a cup serving as a cylinder for the other piston section.

7. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, one of said sections being in the form of a cup serving as a cylinder for the other piston section and provided with ratchet teeth.

8. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load and provided with means for releasably locking said sections together at will.

9. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, one of said piston section being an inner section provided with a releasable catch operable by a shaft extending to the exterior.

10. In a pneumatic pressure device, means for confining an elastic fluid under pressure, a piston within a cylinder, means for releasing a portion of said elastic fluid beneath said piston to support a load, means permitting the utilization of said load in effecting a recompression of said elastic fluid, and a catch releasably retaining a piston in an inner or depressed position.

11. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston being formed in sections, one of which is provided with a catch, and said releasing means being operable in conjunction with said catch.

12. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, one of said piston sections being provided with means permitting a slow escape of air.

13. In a pneumatic pressure device, means for confining an elastic fluid under pressure, a piston within a cylinder, means for releasing a portion of said elastic fluid beneath said piston to support a load, and means permitting the utilization of said load in effecting a recompression of said elastic fluid, said piston comprising sections adapted to operate together in the support of a load, both of said piston sections being provided with means for an application of restoring pressure.

14. In a pneumatic pressure device, a composite piston comprising sections locked together during an elevating or outward movement, but movable independently during a lowering or inward movement of one of said sections under the pressure of a load.

In testimony whereof, I have hereunto set my hand at Los Angeles, California, this 16th day of April, 1924.

JAMES HENRY BAKER.